(12) United States Patent
Roesgen et al.

(10) Patent No.: US 6,695,025 B1
(45) Date of Patent: Feb. 24, 2004

(54) RUNFLAT TIRE CONSTRUCTION WITH PLY CORDS HAVING A VARIABLE MODULUS OF ELASTICITY

(75) Inventors: Alain Emile Francois Roesgen, Luxembourg (LU); Laurent Colantonio, Cobue (BE); Marie-Rita Catherine Amelie Thise-Fourgon, Bastogne (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/959,359
(22) PCT Filed: May 19, 1999
(86) PCT No.: PCT/US99/11081
§ 371 (c)(1),
(2), (4) Date: Oct. 17, 2001
(87) PCT Pub. No.: WO00/69661
PCT Pub. Date: Nov. 23, 2000

(51) Int. Cl.[7] .......................... B60C 9/02; B60C 17/00; B60C 17/08
(52) U.S. Cl. .................. 152/516; 152/548; 152/556; 152/557; 57/902
(58) Field of Search ................... 152/451, 516, 152/517, 548, 556, 557; 57/902

(56) References Cited

U.S. PATENT DOCUMENTS

| | | | |
|---|---|---|---|
| 4,155,394 A | * | 5/1979 | Shepherd et al. ............ 152/527 |
| 4,261,406 A | | 4/1981 | Chemizard et al. |
| 4,281,701 A | | 8/1981 | Ross |
| 4,287,924 A | | 9/1981 | Deck et al. |
| 4,308,907 A | | 1/1982 | Monzini |
| 4,333,507 A | | 6/1982 | Schmit et al. |
| 4,456,048 A | | 6/1984 | Markow et al. |
| 4,654,396 A | | 3/1987 | Bung et al. |
| 4,877,073 A | | 10/1989 | Thise et al. |
| 4,893,665 A | | 1/1990 | Reuter et al. |
| 4,972,893 A | | 11/1990 | Komai et al. |
| 5,058,646 A | * | 10/1991 | Kajikawa et al. ............ 152/454 |
| 5,109,906 A | | 5/1992 | Giancola |
| 5,223,061 A | | 6/1993 | Navaux |
| 5,368,082 A | | 11/1994 | Oare et al. |
| 5,404,924 A | | 4/1995 | Yuze |
| 5,411,071 A | | 5/1995 | Chapelle |
| 5,419,383 A | | 5/1995 | Iwamura |
| 5,427,166 A | | 6/1995 | Willard, Jr. |
| 5,558,144 A | | 9/1996 | Nakayasu et al. |
| 5,695,578 A | | 12/1997 | Boiocchi et al. |
| 5,707,462 A | | 1/1998 | Kikuchi et al. |
| 5,712,011 A | | 1/1998 | McMahon et al. |
| 5,871,600 A | * | 2/1999 | Oare et al. ................. 152/458 |

FOREIGN PATENT DOCUMENTS

| | | |
|---|---|---|
| EP | 0475258 | 3/1992 |
| EP | 0916521 | 5/1999 |
| FR | 725057 | 5/1932 |
| FR | 2063784 | 7/1971 |
| JP | 5-24410 | 2/1993 |

* cited by examiner

Primary Examiner—Jeff H. Aftergut
Assistant Examiner—Justin Fischer
(74) Attorney, Agent, or Firm—Howard M. Cohn (57) ABSTRACT

The tire (70) of the invention incorporates a carcass ply cord material (93) with variable modulus of elasticity to provide an active sidewall structure (82a, 82b). The variable modulus cord material is incorporated in the axially outwardmost ply (90) of a carcass (80) having two plies (88, 90) separated by elastomeric inserts (89a, 89b) in the sidewalls (82a, 82b). The outer ply cord material (93) provides an increased modulus of elasticity with an increase in elongation. The inner ply cords (91) have a modulus that substantially exceeds that of the outer ply cords (93) under normal loads in the inflated mode. Thus, the inner ply (88) dominates the structural response of the sidewalls (82a, 82b) at normal loads in the inflated mode. Under severe sidewall deflection, such as when the tire is uninflated, the outer ply cord (93) is elongated, increasing its modulus of elasticity and thus, shifting the load from the axially inwardmost ply (88) to the axially outwardmost ply (90).

14 Claims, 5 Drawing Sheets

RUNFLAT TIRE CONSTRUCTION WITH PLY CORDS HAVING A VARIABLE MODULUS OF ELASTICITY

TECHNICAL FIELD

This invention relates to pneumatic runflat tires capable of being used in the uninflated or runflat condition and in particular to the ply cords used in the ply construction of the runflat tires.

BACKGROUND OF THE INVENTION

Various methods have been devised for enabling the safe continued operation of unpressurized or underpressurized vehicle tires. The intent of these methods is to minimize further damage to the uninflated tire without simultaneously compromising vehicle handling for a distance between the place where the tire lost its pressure to a place, such as a service station where the tire can be changed.

Pneumatic tires designed for sustained operation under conditions of unpressurization or underpressurization are also called runflat tires, as they are capable of being driven in the uninflated, or what would generally be called "flat," condition. The initials EMT stand for "extended mobility tire," which is an alternative designation for tires having runflat capabilities. The conventional pneumatic tire collapses upon itself when it is uninflated and is carrying the weight of a vehicle. The sidewalls of a conventional tire do not have sufficient rigidity and strength to support the weight of the vehicle without inflation. When pressure is lost, the sidewalls buckle outward in the portion of the tire where the tread contacts the ground, making the tire "flat," at least in that ground-contacting region.

Various tire constructions have been suggested for pneumatic runflat tires. One approach taken has been simply to strengthen the sidewalls by increasing their cross-sectional thickness so as to resist the bending that takes place in the portions of the sidewalls that are adjacent to the ground-contacting portion of the tread. However, due to the large amounts of rubber required to stiffen the sidewall members, flexure heating becomes a major factor in tire failure during runflat operation, especially when the uninflated tire is operated at high speeds. Pirelli discloses such a runflat tire design in European Patent Pub. No. 0 475 258A1.

In general, runflat tire design is predicated upon the use of reinforcing wedge inserts inside each sidewall flex area. The wedge inserts in each sidewall, in combination with the plies, add rigidity to the sidewalls in the absence of air pressure during runflat operation. U.S. Pat. No. 5,368,082, having a common assignee with the present invention, teaches a sidewall construction for runflat tires in which the tire is constructed with two plies, an inner liner and two reinforcing wedge inserts in each sidewall. The two inserts in each sidewall are disposed such that one insert is located between the two plies while the other insert is located between the inner liner and the first or inwardmost ply. While the high resistance to compression deflection of the inserts provides the necessary resistance to the collapse of the uninflated loaded tire, the use of multiple plies and more than one reinforcing wedge insert in each sidewall has drawbacks which include the increase in tire weight and cyclical-flexure-induced heating.

In the interests of operating efficiency and performance, when operating with the tire normally inflated, the modifications to the sidewall and belt areas of the tire providing runflat operation should not adversely interact with the normal inflated operation of the tire. However, as the structure of the sidewall is stiffened with inserts and additional plies to provide runflat operation, some of the desirable operational characteristics of the tire in its inflated state are compromised.

The weight of additional sidewall plies and inserts resists the ability of the automobile suspension to allow the wheel to move in response to variations in the road surface. The increase in stiffness of the sidewall reduces the ability of the tire to comply with variations in the road surface. Both the increase in weight and radial stiffness may degrade the ride comfort and quality increasing harshness and noise perceived by the driver. Increases in tire weight associated with additional plies and inserts will also tend to reduce the performance of the automobile in straight line acceleration and deceleration. The increase in tire weight also tends to increase fuel consumption.

Clearly, the goal in runflat tire design is to provide a low-cost, light-weight tire that gives good runflat vehicle handling as well as good service life during runflat operation without compromising the durability, efficiency or performance of the tire during normal fully inflated operation.

The sidewalls of a fully inflated, conventional tire are thin, light weight and flexible compared to the sidewall of a runflat tire. The flexibility of the sidewall allows the tread area to move in a radial direction, axially inward to allow the tire to absorb bumps. As a portion of tread area moves radially inward, the adjacent sidewall radius of curvature is decreased as the sidewall bulges out. This bending of the sidewall results in a relatively small amount of bending stress because the conventional sidewall is thin. Under normal inflated operation, radial deflection is resisted by the compressive force of the air in the tire. The compressed air provides a resistance to radial deflection that is more than proportional to the deflection. For example a 10% increase in radial deflection will require more than a 10% increase in the load. In effect, the overall modulus of elasticity of a conventional tire with respect to radial deflection is not constant but increases as the deflection decreases the volume of air contained by the tire.

The reinforced sidewalls of runflat tires resist the radial deflection with a combination of compressive and bending stresses in the inflated as well as the uninflated condition. Runflat tires experience a net compressive load in the region of the sidewall closest to the road-contacting portion of the tread. Also, the bending stresses on the thickened sidewalls are such that the outer portions of the sidewalls experience tensile forces while the inner portions experience compression stresses. Thus in addition to providing the structural rigidity required for runflat operation, the reinforced sidewalls of most runflat designs also reduce the desirable radial flexibility of the tire in the inflated condition. Accordingly, the reinforced sidewalls of runflat tires tend to detract from riding comfort, due to the increased structural rigidity of the tire.

The difference in the patterns of radial stiffness between conventional and runflat tires creates several problems. A conventional tire consistently resists each increase in load with an incrementally decreasing radial deflection. With a runflat tire, whether inflated or uninflated, the response to an increase in load depends on the current level of deflection. At the initial increments of radial deflection, a runflat tire is relatively stiff as the sidewalls resist deflection with relatively little bending stress. As the load is increased, bending stresses are increased with increasing sidewall curvature and the stiffness of the tire relative to radial deflection is increased. The tendency of runflat tires to exhibit an increase in stiffness with increasing load complicates the design of the suspension and can reduce the inherent stability of the automobile. For example, in some cases, particularly in the rear wheel of an automobile while cornering, increased radial deflection of the outside rear tire can increase the load on that tire, resulting in yet more deflection in a cycle of weight transfer and deflection that results in oversteer.

The goal of providing a sidewall structure with flexibility in the inflated condition and rigidity in the uninflated condition is limited by the structural characteristics of the conventional materials used to make tires. Conventional materials have a more or less constant modulus of elasticity. A sidewall structure that uses material with a constant modulus of elasticity will tend to provide a sidewall structure that provides a less than proportional resistance to radial deflection as sidewall curvature is increased with the load or loss of air pressure. However, greater stiffness is needed during runflat operation, whereas high stiffness during normal inflated operation has adverse effects on riding comfort. What is needed is the development and use of materials that provide a variable modulus of elasticity depending on the amount of radial deflection.

The potential advantages of variable modulus methods for the refinement of the Banded Tire approach is described in U.S. Pat. No. 4,456,048, entitled "Dual-Modulus Banded Tire." Methods and materials for producing bands with various basic dual-modulus characteristics are disclosed. In one type, the band has a greater resistance to bending forces tending to decrease its local radius of curvature than to those tending to flatten it. In a second type, bending stiffness increases with increasing stress irrespective to the bending direction. In the third type, a two step modulus is demonstrated in which deflection is initially resisted at one rate and final deflection is resisted at a higher rate. However, the application of variable modulus approaches to the design of tire sidewalls was not considered in this prior art patent.

It is apparent that there is a need to develop a sidewall structure that provides the necessary structural rigidity in the uninflated condition while providing sufficient radial flexibility on the inflated condition to provide ride and handling characteristics equivalent to a conventional tire. In addition there is a need to minimize the additional weight of runflat tires.

OBJECTS OF THE INVENTION

It is an objective of the present invention to provide a runflat radial tire as defined in one or more of the appended claims and, as such, having the capability of being constructed to accomplish one or more of the following subsidiary objects.

One objective of the present invention is to provide a runflat tire with an active sidewall structure that is flexible in normal-inflated operation and stiffer in runflat operation.

Another objective of the present invention is to provide a runflat tire with multiple sidewall plies using ply cord materials providing a variable modulus of elasticity in the axially outwardmost ply layers to improve the runflat durability of the tire when the tire is uninflated.

Yet another objective of the present invention is to provide a runflat tire with multiple sidewall plies using ply cord materials providing a variable modulus of elasticity in the axially outwardmost ply layers that do not substantially increase the stiffness of the sidewall structure when the tire is inflated to provide a smooth ride in normal-inflated operation.

SUMMARY OF THE INVENTION

The present invention relates to a pneumatic runflat radial ply tire having a tread, a carcass comprising two or more radial plies, a belt structure located between the tread and the radial ply, two inextensible beads, and two sidewalls each of which is reinforced with one or more wedge inserts. The axially outwardmost ply is reinforced by cords having a modulus of elasticity that increases with strain. The increase in the modulus of elasticity of the reinforcing cords of the axially outwardmost ply can be a linear increase or a nonlinear but continuous increase. Alternatively, the increase in the modulus of elasticity of the reinforcing cords of the axially outwardmost ply might be designed to undergo one or more discontinuous rates of increase with increasing strain. Moreover, the reinforcing cords of the axially outwardmost ply might be designed to have zero to low modulus of elasticity during normal-inflated operation of the tire, while going into tension and exhibiting a high modulus of elasticity during runflat operation. The component parts of the reinforcing cords of the axially outwardmost ply might or might not operate within their respective elastic ranges during all conditions of operation of the tire.

BRIEF DESCRIPTION OF THE DRAWINGS

The structure, operation, and advantages of the invention will become further apparent upon consideration of the following description taken in conjunction with the accompanying drawings, wherein.

DEFINITIONS

"Apex" means an elastomeric filler located radially above the bead core and between the plies and the turnup plies.

"Aspect Ratio" means the ratio of the section height of a tire to its section width; also refers to the cross-sectional profile of the tire; a low-profile tire, for example, has a low aspect ratio.

"Axial" and "Axially" means the lines or directions that are parallel to the axis of rotation of the tire.

"Bead" or "Bead Core" generally means that part of the tire comprising an annular tensile member of radially inner beads that are associated with holding the tire to the rim; the beads being wrapped by ply cords and shaped, with or without other reinforcement elements such as flippers, chippers, apexes or fillers, toe guards and chafers.

"Belt Structure" or "Reinforcement Belts" or "Belt Package" means at least two annular layers or plies of parallel cords, woven or unwoven, underlying the tread, unanchored to the bead, and having both left and right cord angles in the range from 18 degrees to 30 degrees relative to the equatorial plane of the tire.

"Breakers" or "Tire Breakers" means the same as belt or belt structure or reinforcement belts.

"Carcass" means the tire structure apart from the belt structure, tread, undertread over the plies, but including the beads.

"Casing" means the carcass, belt structure, beads, sidewalls and all other components of the tire excepting the tread and undertread.

"Circumferential" most often means circular lines or directions extending along the perimeter of the surface of the annular tread perpendicular to the axial direction; it can also refer to the direction of the sets of adjacent circular curves whose radii define the axial curvature of the tread, as viewed in cross section.

"Cord" means one of the reinforcement strands, including fibers, with which the plies and belts are reinforced.

"Crown" or "Tire Crown" means the tread, tread shoulders and the immediately adjacent portions of the sidewalls.

"Elastic Range" means the maximum strain that a material can tolerate without permanent deformation or loss of strength or elasticity.

"EMT" means extended mobility tire.

"Equatorial Plane" means the plane perpendicular to the tire's axis of rotation and passing through the center of its tread; or the plane containing the circumferential centerline of the tread.

"Footprint" means the contact patch or area of contact of the tire tread with a flat surface at zero speed and under normal load and pressure.

"Inner Liner" means the layer or layers of elastomer or other material that form the inside surface of a tubeless tire and that contain the inflating fluid or gas within the tire.

"Insert" means the crescent- or wedge-shaped reinforcement typically used to reinforce the sidewalls of runflat-type tires.

"Lateral" means a direction parallel to the axial direction.

"Modulus of Elasticity" is the ratio of stress to strain, where stress is the force per unit area and strain is the deformation per unit length.

"Modulus" means Modulus of Elasticity.

"Neutral Bending Axis" means the imaginary plane passing through a material separating areas of compressive stress from areas of tensile stress.

"Normal Inflation Pressure" means the specific design inflation pressure at a specified load assigned by the appropriate standards organization for the service condition for the tire.

"Normal Load" means the specific design inflation pressure and load assigned by the appropriate standards organization for the service condition for the tire.

"Ply" means a cord-reinforced layer of rubber coated radially deployed or otherwise parallel cords.

"Radial" and "radially" mean directions radially toward or away from the axis of rotation of the tire.

"Radial Ply Structure" means the one or more carcass plies or which at least one ply has reinforcing cords oriented at an angle of between 65 degrees and 90 degrees with respect to the equatorial plane of the tire.

"Radial Ply Tire" means a belted or circumferentially-restricted pneumatic tire in which at least one ply has cords which extend from bead to bead are laid at cord angles between 65 degrees and 90 degrees with respect to the equatorial plane of the tire.

"Section Height" means the radial distance from the nominal rim diameter to the outer diameter of the tire at its equatorial plane.

"Section Width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Shoulder" means the upper portion of sidewall just below the tread edge.

"Sidewall" means that portion of a tire between the tread and the bead.

"Tangential" and "Tangentially" refer to segments of circular curves that intersect at a point through which can be drawn a single line that is mutually tangential to both circular segments.

"Tread Cap" refers to the tread and the underlying material into which the tread pattern is molded.

"Tread width" means the arc length of the tread surface in the plane includes the axis of rotation of the tire.

"Wedge Insert" means the same as "Insert."

DETAILED DESCRIPTION OF THE PREFERRED EMBODIMENT

Figure 1:
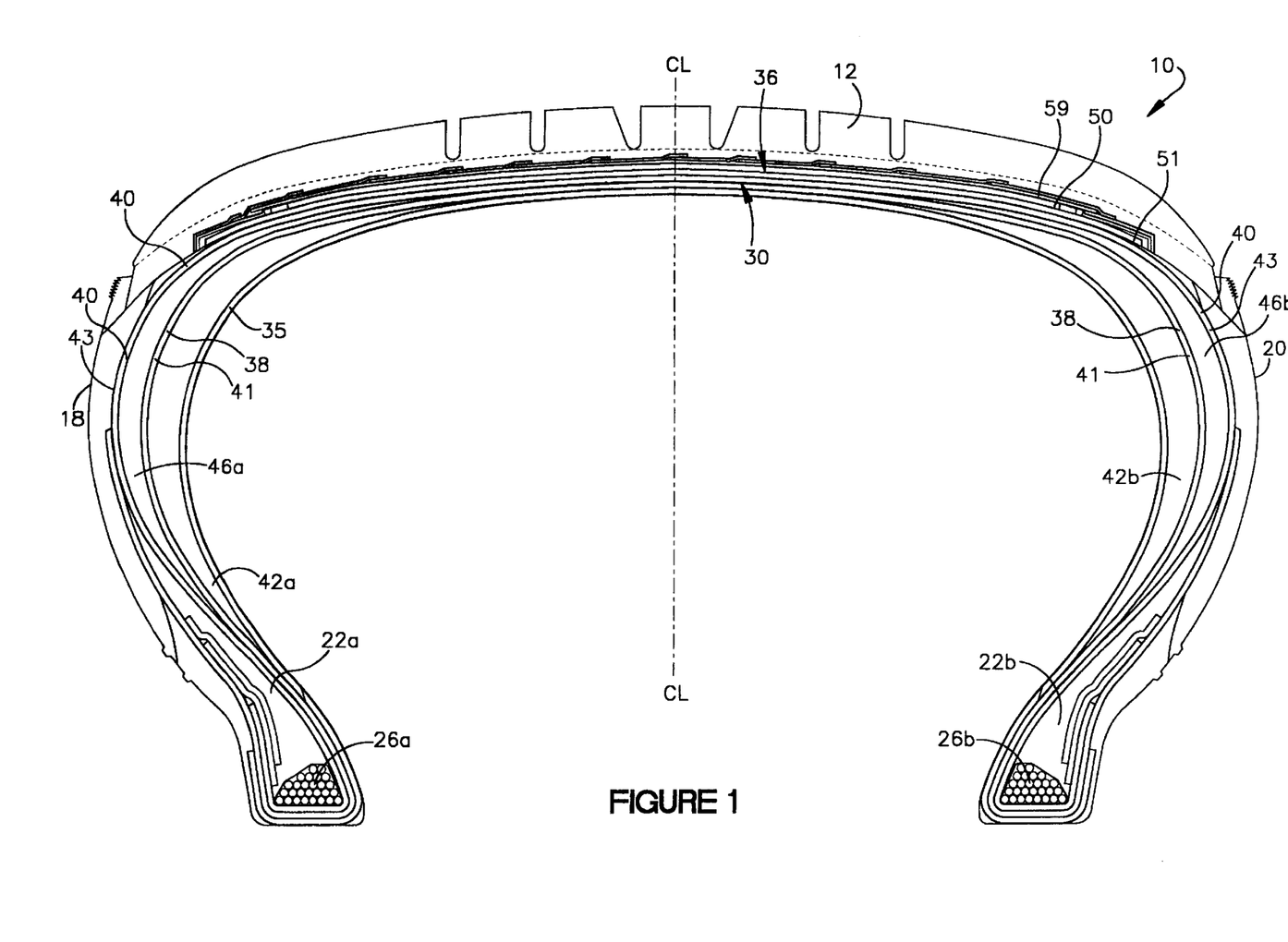
FIG. 1 is a cross-sectional view of a prior art runflat tire.

With reference to FIG. 1, a cross section of a typical prior art pneumatic radial runflat tire 10 is illustrated. The tire 10 has a tread 12, a belt structure 36 comprising belts 50,51, a pair of sidewall portions 18,20, a pair of beads 26a,26b and a carcass structure 30. The carcass 30 comprises a first inner ply 38, second outer ply 40, and a gas-impervious inner liner 35. A pair of bead filler apexes 22a,22b reside radially outward of the beads 26a,26b. Sidewalls 18,20 each contain a first pair of axially inwardmost sidewall wedge inserts 42a,42b, and a second pair of axially outwardmost inserts 46a,46b. The first or inwardmost wedge inserts 42a,42b are disposed between the inner liner 35 and the first ply 38, while the second wedge inserts 46a,46b are disposed between the first ply 38 and the second ply 40. A fabric overlay 59 is deployed beneath, or radially inward of, tread 12 and on top of, or radially outward from, belt structure 36. The wedge inserts 42a,42b,46a,46b impart to the sidewalls a greater structural moment of inertia, or rigidity, for resisting the deformations imposed upon the sidewalls during runflat operation. Thus, the reinforced sidewall portions 18,20 of carcass structure 30 give the tire 10 a limited runflat capability.

The innovative features of the invention will become evident in the treatment which follows wherein the elements of the invention are discussed separately and in operation relation to one another.

Carcass Reinforcing Ply Structures

The radial ply structure 30 of the tire 10, as shown in FIG. 1 comprises at least two reinforcing plies 38,40 separated by an insert 46a,46b. In the particular embodiment illustrated, there is provided an axially inwardmost reinforcing ply 38 and an axially outwardmost reinforcing ply 40 separated by wedge inserts 46a,46b in each sidewall 18,20 respectively. Each ply 38,40 has preferably one layer of radially oriented parallel cords 41,43 respectively. In the particular prior art embodiment illustrated, the cords 41,43 are oriented at an angle of about 90 degrees with respect to the mid-circumferential centerline CL or equitorial plane EP of the tire. However the carcass reinforcing ply structure 30 may comprise of any number of plies of any reinforcing cord orientation. Also each ply may be comprised of any number of ply cords.

Dynamics of Runflat Operation

Figure 2:
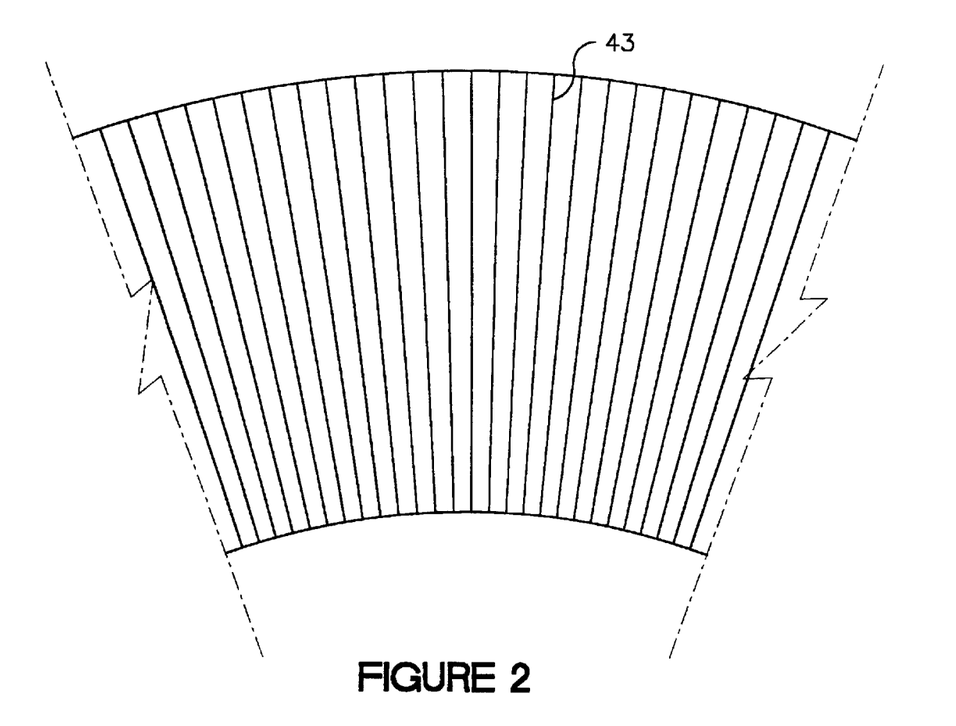
FIG. 2 is a partial detail of the axially outwardmost ply of the sidewall shown in FIG. 1.

The prior art tire 10 shown in FIG. 1, when operated in an uninflated or runflat condition, deforms in such a way that the sidewalls 18,20 buckle axially outward from, or away from, the equatorial plane EP of the tire. Such deformation of the sidewalls causes the first ply 38 to experience a compressive loading, while the second ply 40 becomes loaded in tension. FIG. 2 shows an axial view of the radially aligned reinforcing cords 43 of the second ply 40 of the prior art tire 10 of FIG. 1. During normal-inflated operation, the cords 43 of the second ply 40 can be fully or at least partially unloaded with regard to compression or tension. That is to say, the pneumatic pressure of the tire 10 can be fully contained by the tensile strength of the reinforcing cords of the tire's first ply 38. However, during runflat operation, when the sidewalls 18,20 are deformed axially outward, the reinforcing cords 43 (shown in FIG. 2) are subjected to an increased tensile loading. The tensile loading of the cords 43 is, during runflat operation, cyclical. That is, the tensile loading of the cords 43 is greatest in the region of each sidewall that is most adjacent to the ground-contacting portion of the tread 12, but the tensile loading is minimal to zero in parts of the tire farther removed from the ground-contacting portion of the tread.

Axially Outwardmost Ply Structure

The respective ends of at least one ply of the typical prior art tire are 10 anchored around or clamped to the beads 26a,26b in the tire. In the present invention, to be described in detail below, the second or axially outwardmost ply is, in summary, designed to carry zero to minimal tensile loading during normal-inflated operation, but to carry a tensile loading during runflat operation when the sidewalls are buckled axially outward (i.e., away from the tire's equatorial plane) as they support the vehicle's weight.

Figure 3A:
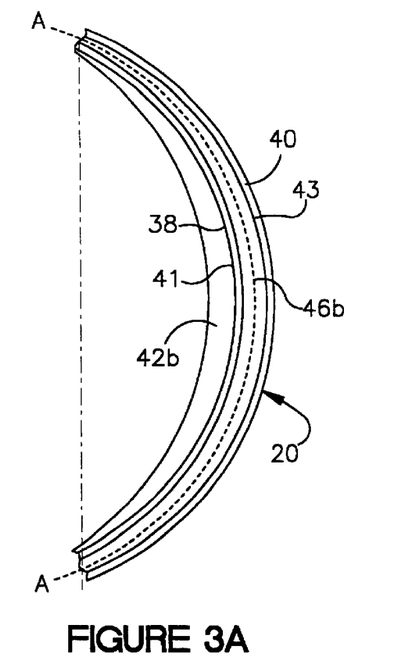
FIG. 3A is a partial cross-sectional view of the prior art sidewall shown in FIG. 1 under normal-inflated operation.
Figure 3B:
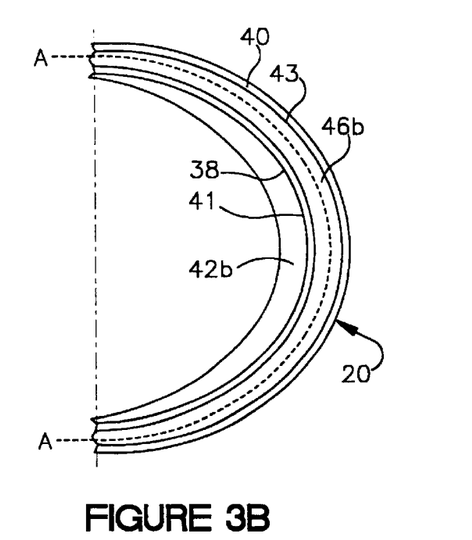
FIG. 3B is a partial cross-sectional view of the sidewall of FIG. 3A under severe deflection such as anticipated for uninflated operation.

FIGS. 3A and 3B show partial sidewall sections for the prior art runflat tire under normal-inflated and runflat. operation respectively. In normal-inflated operation, illustrated by FIG. 3A, bending deflection is insignificant and the entire sidewall structure including both inner and outer ply cords 41,43 respectively are placed in tension as they resist the force of the compressed air in the tire. Under severe deflection such as anticipated for runflat operation, as illustrated by FIG. 3B, material inside the neutral bending axis shown by the dotted line (A—A), such as the inner ply cords 41, are placed in compression and material outside the neutral bending axis, such as outer ply cords 43, are placed in tension. Note that the location of the neutral bending axis (A—A) relative to the inner and outer plies 38,40 is substantially unaffected by the deflection associated with runflat operation. Also, since the location of the neutral bending axis remains substantially constant, the bending stiffness of the sidewall structure is as high in normal-inflated operation as in runflat operation.

Figure 4A:
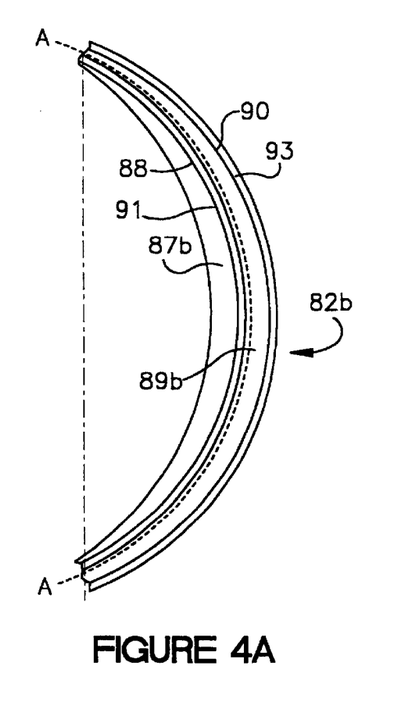
FIG. 4A is a partial cross-sectional view of a sidewall constructed in accordance with the subject invention under normal-inflated operation.
Figure 4B:
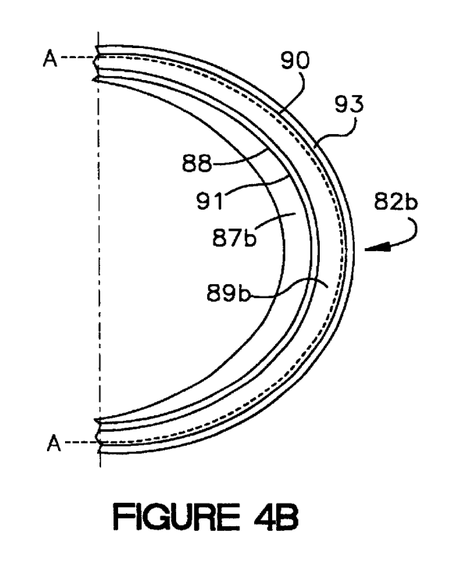
FIG. 4B is a partial cross-sectional view of the sidewall of FIG. 4A under severe deflection such as anticipated for uninflated operation.

FIGS. 4A and 4B show a partial sidewall section 82a for the present invention under normal-inflation and runflat operation, respectively. By using a variable modulus cord 93 material in the axially outwardmost ply 90, where the modulus of the cord increases with elongation, the present invention improves runflat durability without unnecessary sidewall stiffness in normal-inflated operation. With normal-inflated operation, as illustrated by FIG. 4A, the neutral bending axis A—A is found in proximity to the axially inwardmost ply 88 because the outer ply cords 93 are designed to provide a very limited contribution to the sidewall structure under normal conditions. At the increased levels of deflection anticipated for runflat operation, as illustrated by FIG. 4B, the neutral bending axis A—A is found in the proximity of the axially outwardmost ply 90 because the ply cords 93 are designed to support the sidewall structure as their modulus increases with increased deflection. In the transition from normal inflated operation to runflat operation, the neutral axis moves through the insert 89a from the proximity of the axially inwardmost ply 88 to the proximity of the axially outwardmost ply 90. This movement of the neutral axis increases the stiffness of the sidewall by increasing the proportion of the insert 89a that lies on the compression-loaded side of the neutral bending axis A—A. Because a greater percentage of the insert material is more effectively utilized to resist compressive loads, insert thickness and weight may be reduced.

The double-ply structure of the prior art runflat tire results in a sidewall rigidity that has the disadvantage of providing a rough or uncomfortable ride during normal-inflated operation. The present invention seeks to improve the comfort of the ride provided by a runflat tire during normal-inflated operation while also providing good structural rigidity during runflat operation. The present invention serves this goal by providing a second ply that becomes increasingly rigid as it becomes loaded in tension during runflat operation.

Figure 5:
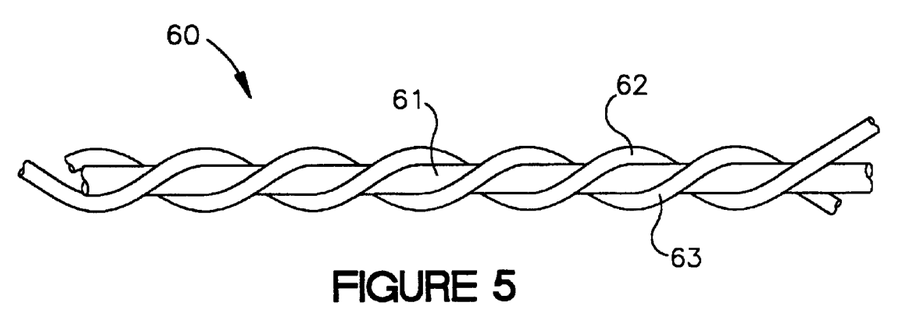
FIG. 5 illustrates the conceptual operation of a variable modulus cord material for use in the axially outwardmost ply.

Referring to FIG. 5 there is illustrated a segment of a reinforcing cord 60 of the sort contemplated for use in the present invention. The cord 60 illustrated in FIG. 5 comprises multiple fibers or cords having different moduli of elasticity. As illustrated in FIG. 5, a core material 61 with a low modulus of elasticity is wound with cords 62,63 made from materials having a high modulus of elasticity. Thus the cord 60 has the property of having a low modulus of elasticity under conditions of minimal tensile deformation. However, under conditions of high tensile deformation, the cords or fibers 62,63, which are shown to be wrapped in a kind of double helix around the core cord or fiber 61, become increasingly straightened, ultimately becoming the main bearers of the tensile forces imposed upon the cord 60. Further tensile deformation of the cord 60 therefore imposes the bulk of the tensile loading upon the high-modulus cords 62,63. In net effect, the reinforcing cord 60 has the bulk property of having a variable modulus of elasticity. In other words, the modulus of elasticity of the cord 60 is low at low tensile loading, but it increases as the tensile loading or tensile strain increases and the helical fibers or cords 62,63 become increasing straightened as they assume increased tensile loading.

Figure 6:
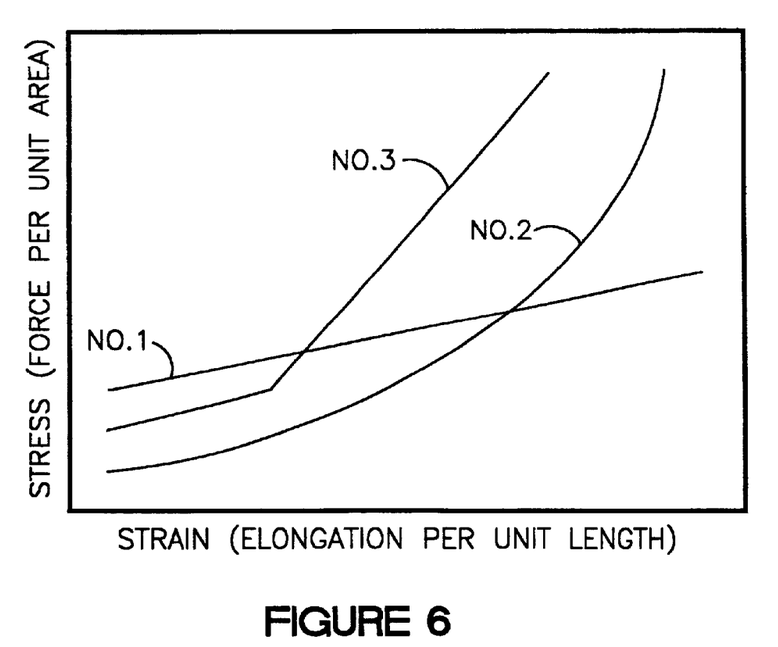
FIG. 6 is a graph illustrating the relationship of stress to strain for materials with constant and variable moduli of elasticity.

The variable-modulus nature of the cord 60 shown in FIG. 5 is illustrated in FIG. 6, which shows stress/strain curves for various material. The slopes of the curves represent the modulus of elasticity of the given materials at various levels of stress or strain. For example, a pure material such as metal or elastomer would have a stress/strain curve represented by the curve labeled No. 1, which has a constant slope (that is, it is a straight line indicating a constant modulus of elasticity). Curve No. 2, by contrast has a variable modulus that increases continuously with stress or strain. In other words, the curve No. 2 has a slope that increases with strain, which corresponds to a modulus of elasticity that increases with strain. Such an increase in modulus of elasticity means that the variable-modulus material represented by the curve No. 2 becomes more rigid as the strain increases. Curve No. 3 in FIG. 6 represents the variable modulus properties of a composite material having a low modulus under conditions of low stress, followed by a discontinuous transition to a high modulus of elasticity beyond a certain level of strain. A simple example of a composite tensile-load-bearing reinforcing cord having the stress/strain properties shown in curve No. 3 would be, for example, a loose chain in combination with a rubber cord such as a bungy cord. Such an arrangement would work in a way that the bungy cord (having a low modulus of elasticity) would represent the low-slope part of curve No. 3, up to the stress level where all of the slack is removed from the chain, at which point the gross modulus of elasticity of the chain would correspond to the steeper portion of the curve No. 3.

For the operation of the inventive concept, the modulus of elasticity of the outer ply cord may increase with a linear or nonlinear response to increasing strain. Also, in response to increasing strain, the modulus of elasticity of the outer ply cord may increase in a continuous manner or with one or more discontinuous rates where the modulus may increases with abrupt transitions with ranges of constant modulus and varying modulus at various levels of strain. For example, at low levels of strain the modulus of elasticity could be equal to zero (like a slack cord) while at some increased strain the modulus would abruptly increase providing substantial resistance to further strain or elongation.

While the cord 60 illustrated in FIG. 5 represents one method by which to provide a variable modulus reinforcing cord for the second ply of a runflat tire, the inventor does not intend that the cord 60 should be construed as the only or best or preferred way to achieve the desired goal of providing a variable modulus reinforcing cord of the second ply of a runflat tire. To reiterate, the goal of the present invention is to provide a tire whose second ply offers increased resistance to tensile deformation during runflat operation while, at the same time, it does not contribute to the overall rigidity of the tire's sidewalls during normal-inflated operation.

Another example of a reinforcing cord that satisfies the objective of the present invention is the one covered by Goodyear U.S. Pat. No. 4,877,073, ('073) by Thise et al. The patent '073 discloses a non-metallic cable having utility in an overlay ply for a tire. This cable is comprised of two yarns. One of the yarns has a twist of zero or is twisted in a first direction. The other yarn has a yarn twist that is twisted in a direction opposite to the direction of the twist in the first yarn. The cable has a twist that is opposite in direction to the twist of the yarn having the larger of the two yarn twists. These cables show low modulus at low deformation and high modulus at high deformation. This prior art patent also discloses a tire having a belt structure overlaid with these cables disposed radially outward of at least one of the belt plies. However '073 does not disclose the use of this type of cable to enhance the sidewall structure of runflat tires.

Cord materials with a variable modulus of elasticity that could be used to satisfy the objective of the present invention have been developed and applied to reinforcing cords for tires and other rubber articles. However, this prior art does not disclose the application of variable modulus cord materials in the sidewalls of tires. For example, U.S. Pat. No. 5,558,144 ('144) Nakayasu et al. discloses a hybrid cord comprised of a low elastic modulus thread and a high elastic modulus thread which are fully twisted together where the force at 6% elongation is five times greater than the force at 2% elongation. In comparison with a simple material with a constant modulus of elasticity, the force at 6% elongation would be approximately three times the force at 2% elongation. The '144 Patent applies this hybrid cord material in the belt structure to solve specific problems with the manufacture of tires using high elastic modulus organic fiber cords in the tire belt.

Another example of a reinforcing cord that satisfies the objective of the present invention is provided by U.S. Pat. No. 5,419,383, ('383) by lwamura. The '383 patent discloses a belt cord material comprising a higher modulus strand and a lower modulus strand which are twisted together. The higher modulus and the lower modulus strands are each made of at least one continuous strand of organic filament where the length of the higher modulus filament is from 104 to 124% of the length of the lower modulus filament, each measured along the filament in an unloaded state. Thus comprised, the belt cord material disclosed by '383 effectively provides a variable modulus of elasticity. As with '144 the inventive approach is applied to spiral wound belt cords. The use of this type of variable modulus cords for sidewall plies or to provide improved runflat performance is not disclosed.

Various composite materials and other methods have been described or listed for providing a second ply that is reinforced by cords having a modulus of elasticity that increases with tensile loading, for use in an EMT or runflat tire. The inventors recognize that the basic principle might even be achieved by the use of high-modulus second-ply reinforcing cords that are laid up slack during manufacture and which remain mostly slack during normal-inflated operation but which become taught when the sidewalls become deformed during runflat operation.

Figure 7:
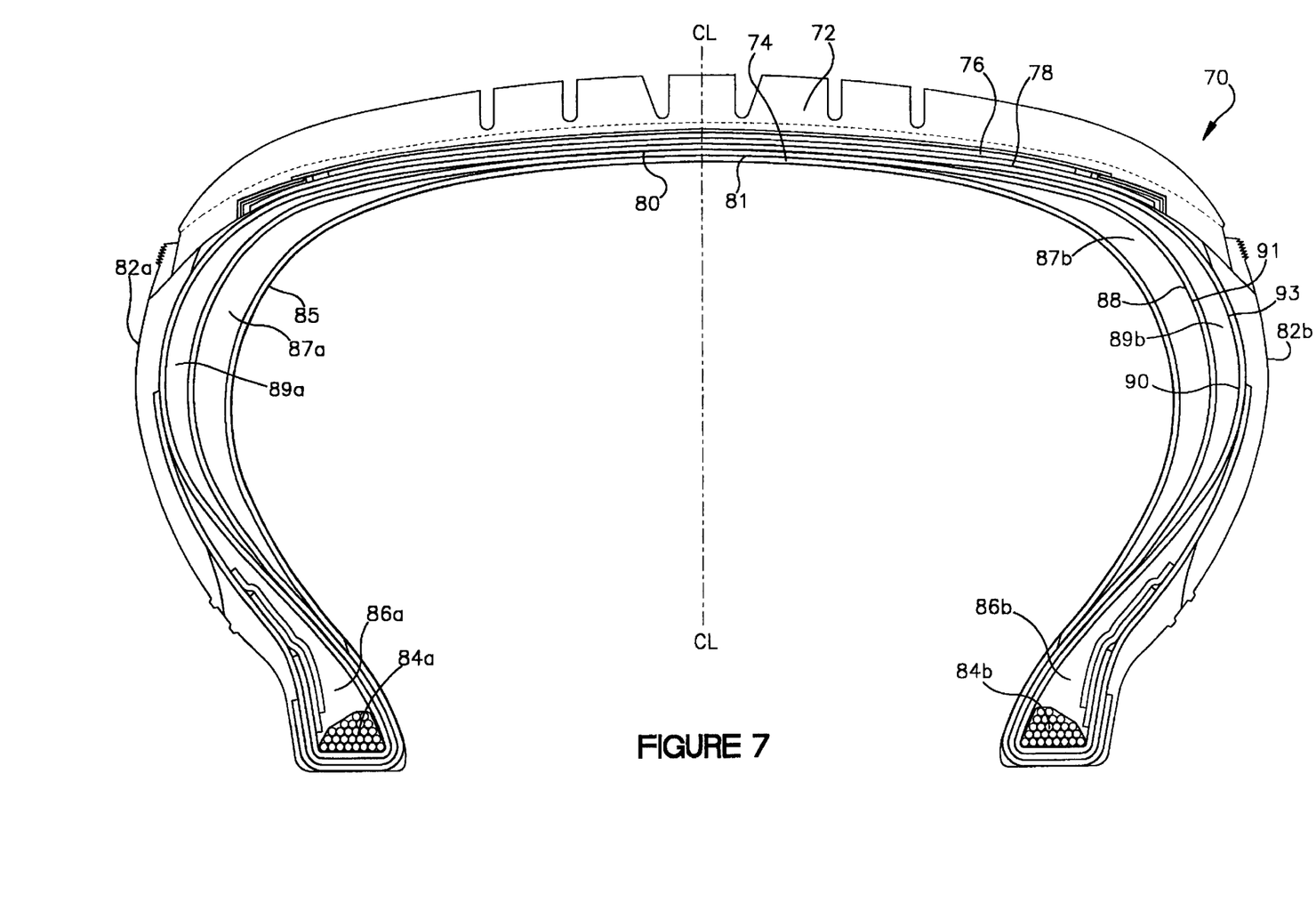
FIG. 7 is a cross-sectional view of a runflat tire embodying the present invention.

With reference to FIG. 7, a cross section of a pneumatic radial runflat tire 70 incorporating the invention is illustrated. The tire 70 has a tread 72, a belt structure 74 comprising belts 76,78, a pair of sidewall portions 82a,82b, a pair of beads 84a,84b and a carcass structure 80. The carcass 80 comprising a radial ply structure 81 having a first or axially inwardmost ply 88 and second or axially outwardmost ply 90, and a gas-impervious inner liner 85. A pair of bead filler apexes 86a,86b reside radially outward of the beads 84a,84b. Sidewalls 82a,82b each contain a first pair of axially inwardmost sidewall wedge inserts 87a,87b, and a second pair of axially outwardmost inserts 89a,89b. The first or inwardmost wedge inserts 87a,87b are disposed between the inner liner 85 and the first ply 88, while the second wedge inserts 89a,89b are disposed between the first ply 88 and the second ply 90. The second or axially outwardmost ply 90 is reinforced with cords 93 of the sort characterized by the variations of variable modulus of elasticity concept contemplated by the present invention, thereby providing a runflat tire that gives good riding comfort and good vehicle handling during normal-inflated operation while simultaneously being able to provide good runflat properties and good runflat operational service life.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

What is claimed:

1. A pneumatic radial ply runflat tire having a tread, two inextensible annular beads, a carcass comprising a radial ply structure having at least an axially inwardmost ply and an axially outwardmost ply, a belt structure located between the tread and the radial play structure, an inner liner, and two sidewalls each being reinforced by at least one wedge insert, the tire being characterized by:

the axially inwardmost ply and the axially outwardmost ply being separated by the wedge insert in each sidewall;

the axially inwardmost ply is reinforced by reinforcing cords having a substantially constant modulus of elasticity; and the axially outwardmost ply is reinforced by reinforcing cords having a modulus of elasticity that varies with strain, wherein said reinforcing cords in the axially outwardmost ply are constructed of multiple cords having different moduli of elasticity that operate within their respective elastic ranges during all conditions of operation of the tire.

2. The tire of claim 1 characterized in that the reinforcing cords of the axially outwardmost ply undergo an increase in modulus of elasticity with increasing tensile strain.

3. The tire of claim 2 characterized in that the reinforcing cords of the axially outwardmost ply undergo a linear increase in modulus of elasticity with increasingly tensile strain.

4. The tire of claim 2 characterized in that the reinforcing cords of the axially outwardmost ply undergo a nonlinear and continuous increase in modulus of elasticity with increasing tensile strain.

5. The tire of claim 2 characterized in that the reinforcing cords of the axially outwardmost ply undergo one or more discontinuous rates of increase in modulus of elasticity with increasing tensile strain.

6. The tire of claim 2 characterized in that the reinforcing cords of the axially outwardmost ply have zero to low modulus of elasticity during normal-inflated operation of the tire.

7. The tire of claim 6 characterized in that the reinforcing cords of the axially outwardmost ply have a high modulus of elasticity during runflat operation of the tire.

8. The tire of claim 2 characterized in that the reinforcing cords of the axially outwardmost ply are constructed of multiple cords having different moduli of elasticity that operate beyond their respective elastic ranges when experiencing maximum strains associated with runflat operation.

9. A pneumatic radial ply runflat tire having a tread, two inextensible annular beads, a carcass comprising a radial ply structure having at least an axially inwardmost ply and an axially outwardmost ply, a belt structure located between the tread and the radial ply structure, an inner liner, and two sidewalls each being reinforced by at least one wedge insert, the tire being characterized by:

the axially inwardmost ply is reinforced by reinforcing cords having a substantially constant modulus of elasticity; and the axially outwardmost ply is reinforced by reinforcing cords having a modulus of elasticity that varies with strain wherein the reinforcing cords of the axially outwardmost ply comprise a core material with a low modulus of elasticity wound with cords made from materials having a high modulus of elasticity.

10. The tire of claim 9 characterized in that the reinforcing cords of the axially outwardmost ply comprise a cable comprised of two yarns, a first one of the yarns has a twist of zero or is twisted in a first direction and a second of the two yarns is twisted in a direction opposite to the direction of the twist in the first yarn, and the cable has a twist that is opposite in direction to the twist of the yarn having the larger of the two yarn twists.

11. The tire of claim 9 characterized in that the reinforcing cords of the axially outwardmost ply comprise a hybrid cord comprised of a low elastic modulus thread and a high elastic modulus thread which are fully twisted together, where the force at 6% elongation is five times greater than the force at 2% elongation.

12. The tire of claim 9 characterized in that the reinforcing cords of the axially outwardmost ply comprise a higher modulus strand and a lower modulus strand which are twisted together.

13. The tire of claim 12 characterized in that the higher modulus and the lower modulus strands are each made of at least one continuous strand of organic filament where the length of the higher modulus filament is from 104% to 124% of the length of the lower modulus filament.

14. The tire of claim 9 characterized in that the reinforcing cords of the axially outwardmost ply are laid up slack during manufacture and remain mostly slack during normal-inflated operation, and become taut when the sidewalls become deformed during runflat operation.

* * * * *